United States Patent
Basler et al.

(10) Patent No.: US 9,544,579 B2
(45) Date of Patent: *Jan. 10, 2017

(54) STEREOSCOPIC DUAL MODULATOR DISPLAY DEVICE USING FULL COLOR ANAGLYPH

(71) Applicant: Dolby Laboratories Licensing Corporation, San Francisco, CA (US)

(72) Inventors: Brad Basler, San Mateo, CA (US); Giorgio Giaretta, Scotch Plains, NJ (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/972,550

(22) Filed: Dec. 17, 2015

(65) Prior Publication Data

US 2016/0105666 A1    Apr. 14, 2016

Related U.S. Application Data

(63) Continuation of application No. 13/505,270, filed as application No. PCT/US2010/053373 on Oct. 20, 2010, now Pat. No. 9,251,740.

(60) Provisional application No. 61/255,596, filed on Oct. 28, 2009.

(51) Int. Cl.
*H04N 13/04* (2006.01)
*G09G 3/34* (2006.01)

(52) U.S. Cl.
CPC ........ *H04N 13/0422* (2013.01); *G09G 3/3413* (2013.01); *G09G 3/3426* (2013.01); *H04N 13/0431* (2013.01); *H04N 13/0486* (2013.01); *G09G 2320/0646* (2013.01); *H04N 13/0456* (2013.01)

(58) Field of Classification Search
None
See application file for complete search history.

(56) References Cited

U.S. PATENT DOCUMENTS

| | | |
|---|---|---|
| 6,283,597 B1 | 9/2001 | Jorke |
| 6,891,672 B2 | 5/2005 | Whitehead |
| 7,403,332 B2 | 7/2008 | Whitehead |
| 7,784,938 B2 | 8/2010 | Richards |
| 7,959,295 B2 | 6/2011 | Richards |
| 8,217,970 B2 | 7/2012 | Whitehead |
| 2007/0132953 A1 | 6/2007 | Silverstein |
| 2007/0188711 A1 | 8/2007 | Sharp |
| 2008/0094528 A1 | 4/2008 | Robinson |

(Continued)

FOREIGN PATENT DOCUMENTS

| | | |
|---|---|---|
| JP | 2007-300658 | 11/2007 |
| WO | 9746029 | 12/1997 |

(Continued)

*Primary Examiner* — Zhengxi Liu

(57) ABSTRACT

Systems and methods are provided for displaying three-dimensional image data on a display having a light source modulation layer and a display modulation layer. The light source modulation layer has light sources for providing spatially modulated, spectrally separated light for displaying time-multiplexed left and right eye images. The display modulation layer has pixels for spatially modulating the amount of light received from the light source modulation layer.

25 Claims, 8 Drawing Sheets

(56) References Cited

U.S. PATENT DOCUMENTS

| | | |
|---|---|---|
| 2008/0151193 A1 | 6/2008 | Reder |
| 2008/0158672 A1 | 7/2008 | McCosky |
| 2008/0180466 A1* | 7/2008 | Whitehead ........... G09G 3/3426 |
| | | 345/698 |
| 2008/0239121 A1* | 10/2008 | Egawa ................... H04N 5/367 |
| | | 348/294 |
| 2009/0085912 A1 | 4/2009 | Scott |
| 2009/0184917 A1 | 7/2009 | Park |
| 2010/0238274 A1 | 9/2010 | Kim |

FOREIGN PATENT DOCUMENTS

| | | |
|---|---|---|
| WO | WO 03077013 | 9/2003 |
| WO | 2006/010244 | 2/2006 |
| WO | 2007127269 | 11/2007 |
| WO | 2008/092276 | 8/2008 |
| WO | 2008/140787 | 11/2008 |
| WO | 2009/045451 | 4/2009 |

* cited by examiner

FIG. 7B     FIG. 7C

STEREOSCOPIC DUAL MODULATOR DISPLAY DEVICE USING FULL COLOR ANAGLYPH

CROSS REFERENCE TO RELATED APPLICATIONS

This application is a continuation application of U.S. patent application Ser. No. 13/505,270 which is a national phase application of PCT application No. PCT/US2010/053373 filed on Oct. 20, 2010 which claims priority to U.S. Provisional Patent Application No. 61/255,596 filed 28 Oct. 2009 which is hereby incorporated by reference in its entirety.

TECHNICAL FIELD

This invention relates to backlit displays comprising solid state illumination devices, such as light-emitting diodes (LEDs). Particular embodiments provide for systems and methods for displaying stereoscopic or three-dimensional (3D) images.

BACKGROUND

A 3D visual effect may be generated by presenting different images to a viewer's left and right eyes. Each of the left and right eye images represent different perspectives of the same scene or object. The viewer's brain combines and interprets the left and right eye images to perceive a single 3D image having the illusion of depth.

One method of creating a 3D visual effect on a display is to provide spectrally filtered light to the viewer so that the left eye is presented with light in a first set of spectral bands (providing a left eye image) and the right eye is presented with light in a complementary, second set of spectral bands (providing a right eye image). The viewer wears spectral filtration glasses to view the spectrally separated left and right eye images. The glasses have a left eye filter allowing light within the first set of spectral bands to pass through, and blocking substantially all light which is not within the first set of spectral bands. The glasses also have a right eye filter allowing light within the second set of spectral bands to pass through, while blocking substantially all light which is not within the second set of spectral bands. The display may alternate between displaying the left and right eye images so that the left and right eye images are time-multiplexed. FIG. 1A illustrates two complementary sets of red, green and blue (R, G, B) spectral bands which may be used for displaying left and right eye images. FIG. 1A plots intensity as a function of wavelength for light having a spectral composition comprising a first set 11 of spectral bands R1, G1 and B1 (which may be used as the left eye spectral bands), and for light having a spectral composition comprising a second set 13 of spectral bands R2, G2 and B2 (which may be used as the right eye spectral bands).

Spectral filtration has been applied to projection displays. Some examples of projection displays using spectral filtration are described in: United States Patent Application Publication No. 2008/0284982 published 20 Nov. 2008 and entitled SPECTRAL SEPARATION FILTERS FOR 3D STEREOSCOPIC D-CINEMA PRESENTATION and United States Patent Application Publication No. US2008/0278807 published 13 Nov. 2008 and entitled METHOD AND SYSTEM FOR SHAPED GLASSES AND VIEWING 3D GLASSES.

Spectral filtration has also been applied to backlit displays. Some examples of backlit displays using spectral filtration are described in: United States Patent Application Publication No. 2007/0188711 published 16 Aug. 2007 and entitled MULTI-FUNCTIONAL ACTIVE MATRIX LIQUID CRYSTAL DISPLAYS, United States Patent Application Publication No. 2008/0094528 published 24 Apr. 2008 and entitled LED ILLUMINATION FILTERS, and United States Patent Application Publication No. 2009/0085912 published 2 Apr. 2009 and entitled FULL-COLOR ANAGLYPH THREE-DIMENSIONAL DISPLAY.

One type of dual modulation display has a light source modulation layer comprising an array of light sources (e.g. solid state illumination devices such as LEDs) and a display modulation layer comprising an array of pixels (e.g. LCD pixels). The light sources may be driven to spatially modulate the intensity of light directed at the display modulation layer. The display modulation layer pixels may be driven to spatially modulate the amount of light passed through the pixels. Some examples of dual modulation displays are described in: U.S. Pat. No. 6,891,672 issued 10 May 2005 and entitled HIGH DYNAMIC RANGE DISPLAY DEVICES, U.S. Pat. No. 7,403,332 issued 22 Jul. 2008 and entitled HIGH DYNAMIC RANGE DISPLAY DEVICES, and United States Patent Application Publication No. 2008/0180466 published 31 Jul. 2008 and entitled RAPID IMAGE RENDERING ON DUAL-MODULATOR DISPLAYS all of which are hereby incorporated herein by reference for all purposes. There is a general desire to provide alternative methods and systems for displaying 3D images.

SUMMARY

One aspect of the invention provides a display system for displaying 3D image data. The image data comprises left eye image data and right eye image data. The display system has a display comprising a light source modulation layer and a display modulation layer. The light source modulation layer comprises a first plurality of light sources operable to provide spatially modulated light for display of the left eye image data and a second plurality of light sources operable to provide spatially modulated light for display of the right eye image data. The display modulation layer comprises a plurality of pixels operable to spatially modulate light received from the light source modulation layer. The first plurality of light sources is configured to provide light having a first spectral composition, and the second plurality of light sources is configured to provide light having a second spectral composition which is complementary to the first spectral composition. The first and second pluralities of light sources are operable to sequentially provide, in a time-multiplexed manner, spatially modulated light for display of the left eye image data and spatially modulated light for display of the right eye image data.

The display system also has a controller configured to perform methods of the invention. The controller is configured to determine: a first plurality of light source modulator control values for driving the first plurality of light sources based at least in part on the left eye image data; a second plurality of light source modulator control values for driving the second plurality of light sources based at least in part on the right eye image data; a first plurality of display modulation layer control values for driving the display modulation layer pixels based at least in part on the left eye image data; and a second plurality of display modulation layer control values for driving the display modulation layer pixels based at least in part on the right eye image data.

The controller is further configured to determine: a first effective luminance pattern of light received on the display modulation layer from the first plurality of light sources of the light source modulation layer, based at least in part on the first plurality of light source modulator control values; and a second effective luminance pattern of light received on the display modulation layer from the second plurality of light sources of the light source modulation layer, based at least in part on the second plurality of light source modulator control values. The controller is further configured to determine: the first plurality of display modulation layer control values based at least in part on the first effective luminance pattern and the left eye image data; and the second plurality of display modulation layer control values based at least in part on the second effective luminance pattern and the right eye image data.

In addition to the exemplary aspects and embodiments described above, further aspects and embodiments will become apparent by reference to the drawings and by study of the following detailed description.

BRIEF DESCRIPTION OF THE DRAWINGS

In drawings which illustrate non-limiting embodiments:

FIGS. 7B and 7C illustrate the FIG. 7A illuminated object as seen by the viewer's left and right eyes, respectively;

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 2:
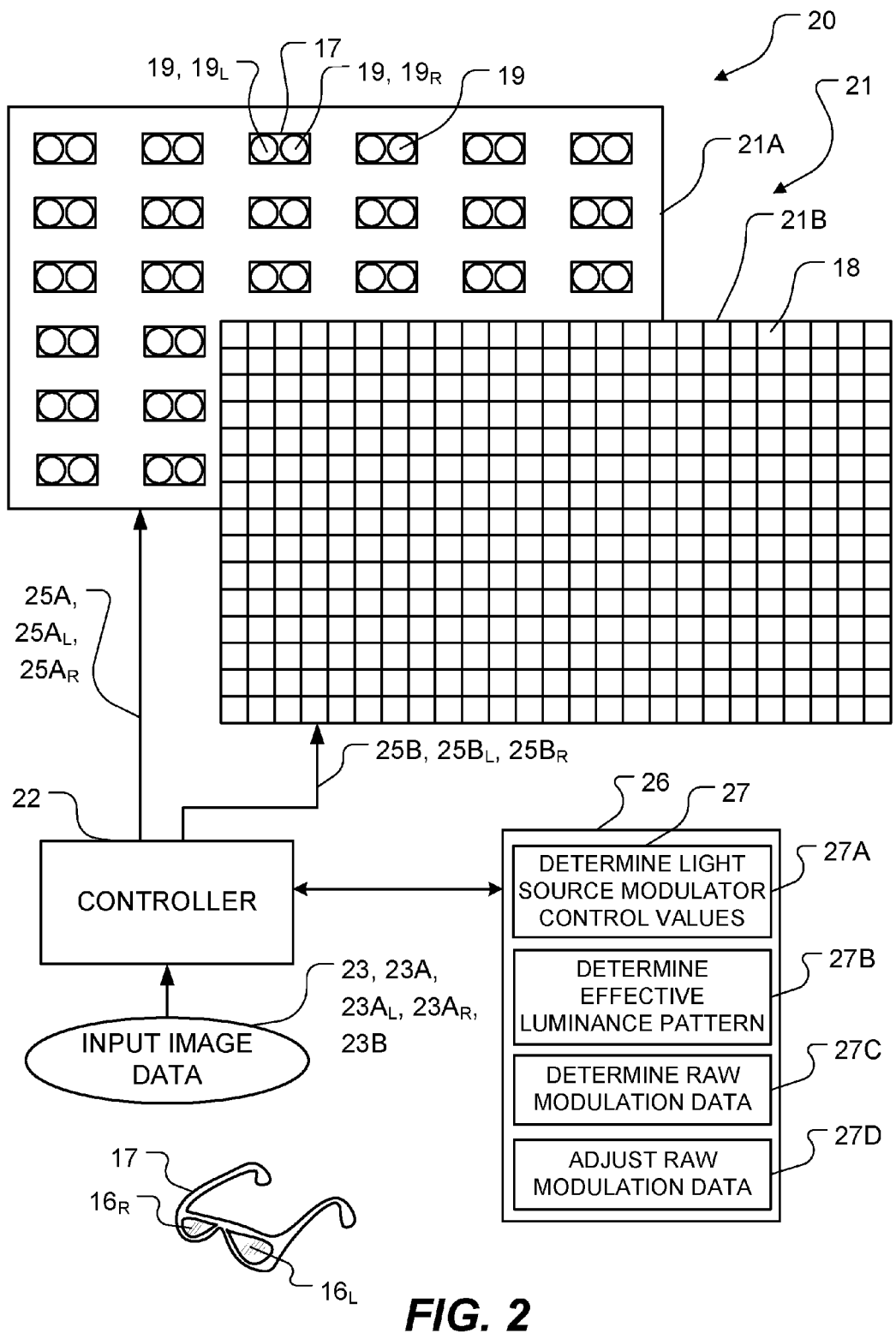
FIG. 2 schematically illustrates a display system that may be used to display 3D images according to an example embodiment.

FIG. 2 depicts a dual modulation display system 20 according to a particular embodiment. Display system 20 may be configured to perform methods of the invention. Display system 20 may operate in a 3D display mode for displaying a 3D image from 3D image data 23A. Image data 23A comprises left eye image data $23A_L$ and right eye image data $23A_R$. In some embodiments, display system 20 may also operate in a two-dimensional (2D) display mode for displaying a non-3D (i.e. 2D) image from 2D image data 23B. Display system 20 comprises a display 21. Display 21 may comprise a high brightness and/or high dynamic range (HDR) display. In the illustrated embodiment, display 21 comprises a dual modulation display having a light source modulation layer 21A and a display modulation layer 21B.

Display system 20 comprises a controller 22, which may comprise a central processing unit (CPU), one or more microprocessors, one or more field programmable gate arrays (FPGAs), one or more graphics processing units (GPUs), one or more digital signal processors (DSPs), or any combination thereof, or any other suitable processing unit(s) comprising hardware and/or software capable of functioning as described herein. Controller 22 processes input image data 23A or 23B to generate light source modulator control values 25A to drive light source modulation layer 21A, and display modulator control values 25B to drive display modulation layer 21B.

Light source modulation layer 21A comprises a matrix of light sources 19. In the illustrated embodiment of FIG. 2, light sources 19 are arranged as pairs 17 of light sources $19_L$, $19_R$. Light sources $19_L$, $19_R$ within a pair 17 may be closely spaced. Each of light sources 19 (including light sources $19_L$, $19_R$) may comprise solid state illumination devices, such as LEDs. In such embodiments, control values 25A provided to light source modulation layer 21A comprise LED drive values. Control values 25A may be digital LED drive values or analog LED drive values (e.g. drive currents) or pulse width modulation (PWM) signals or the like. When display system 20 is operating in 3D display mode, control values 25A comprise:

control values $25A_L$ for driving LEDs $19_L$ to provide spatially modulated light for displaying a left eye image; and control values $25A_R$ for driving LEDs $19_R$ to provide spatially modulated light for displaying a right eye image.

Figure 1A:
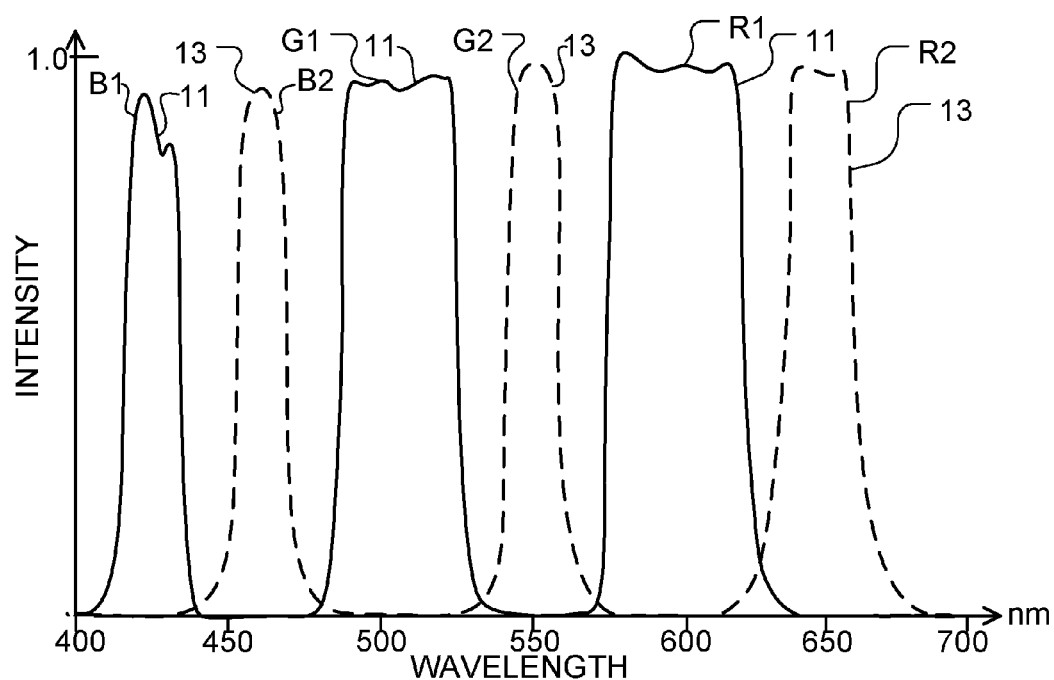
FIG. 1A is a graph illustrating two sets of complementary RGB spectral bands of light for displaying left and right eye images.
Figure 1B:
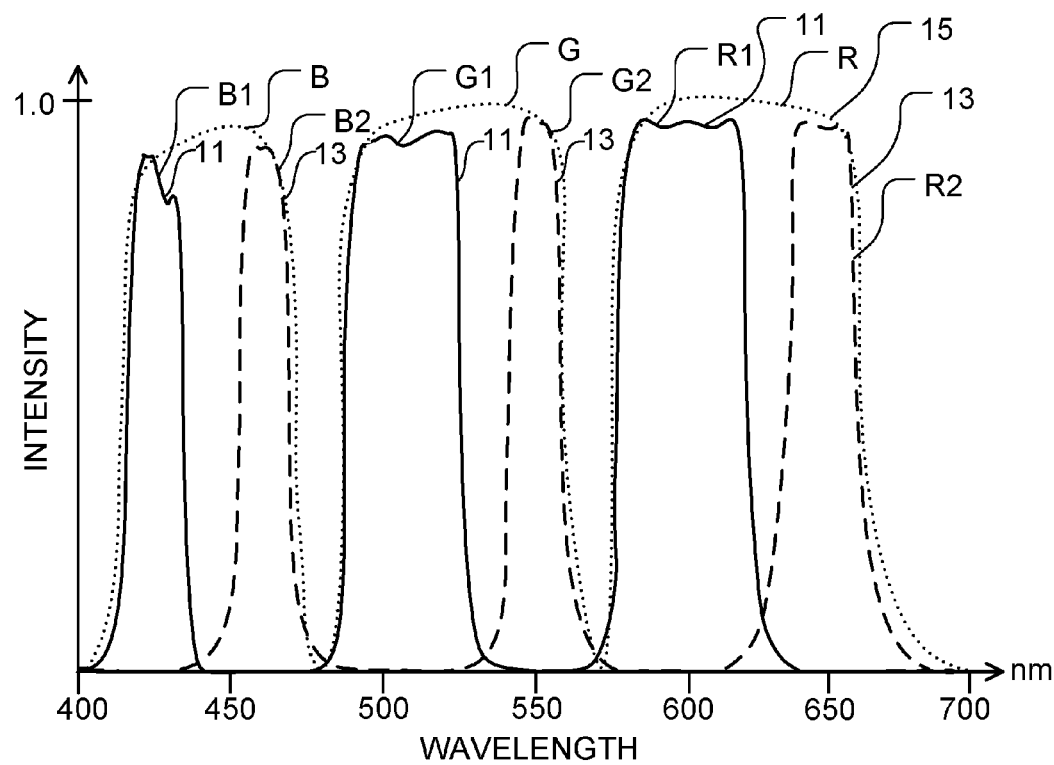
FIG. 1B is a graph illustrating RGB spectral bands of broadband light passed through a display modulation layer colour filter, shown superimposed over two sets of complementary RGB spectral bands of light used for displaying left and right eye images.

Light sources 19 of light source modulation layer 21A may provide light having complementary spectral bands in a set of primary colours defining a suitable colour gamut, for example, the red, green and blue visible light spectrum. In the illustrated embodiment of FIG. 2, the spectral composition of light provided by LEDs $19_L$ may comprise a first set 11 of spectral bands R1, G1 and B1 (left eye spectral bands), and the spectral composition of light provided by LEDs $19_R$ may comprise a second set 13 of spectral bands R2, G2 and B2 (right eye spectral bands), as seen in FIGS. 1A and 1B. Other complementary sets of spectral bands may be used to provide spectrally separated left and right eye images. For example, in some embodiments, one or both of sets 11, 13 may include more than one band within the red, green and/or blue visible light spectrum. Any one of sets 11, 13 may be assigned as the left eye spectral bands, with the remaining set being assigned as the right eye spectral bands.

The complementary spectral bands of light provided by light source modulation layer 21A may be provided in one or more of the following ways, including a combination thereof:

Light sources 19 (e.g. LEDs $19_L$, $19_R$) may be provided which emit light having a spectral composition of different wavelengths of light over the desired spectral range.

Spectral filters may be provided for light sources 19 (e.g. LEDs $19_L$, $19_R$) to allow transmission of the desired spectral bands and block transmission of other spectral bands. In particular embodiments, a collimator may be provided between the spectral filter and the LED light source which collimates the light so that the light is incident on the spectral filter at an angle which is perpendicular to the filter.

Light sources 19 may comprise tri-colour LEDs having red, green and blue LEDs, typically encapsulated within a single housing. Each of LEDs $19_L$, $19_R$ may comprise a tri-colour LED.

Various configurations of LEDs may be provided in place of LEDs $19_L$, $19_R$. For example, a plurality of LEDs each emitting light in a desired spectral band (e.g. R1, R2, G1, G2, B1 and B2 as seen as FIGS. 1A and 1B) may be provided as light sources 19 of light source modulation layer 21A. Such LEDs may be housed separately, or they may be grouped and/or encapsulated within LED housings in one of various permutations of spectral bands. Such permutations may include, for example:

(a) R1 and R2; G1 and G2; B1 and B2;
(b) R1, G1 and B1; R2, G2 and B2;
(c) R1, R2, B1, B2, G1 and G2;
(d) and the like.

Drive signals may be applied to light sources 19 to adjust and/or shift the spectral composition of light emitted by the light sources. For example, a set of LEDs may be provided as light sources 19 of light source modulation layer 21A, and the spectral composition of light provided by each LED may be shifted by controlling the drive signal applied to the LED (e.g. by adjusting voltage supply, etc.). LEDs 19 may be driven one way to provide light in the left eye spectral bands and LEDs 19 may be driven in another way to provide light in the right eye spectral bands. In some embodiments, a light source may be driven in such a way so as to shift the spectral composition of emitted light without also significantly changing the brightness of the emitted light.

The intensity of light emitted by each of LEDs $19_L$ may be individually controlled by applying a different control value $25A_L$ to each LED $19_L$. Likewise, the intensity of light emitted by each of LEDs $19_R$ may be individually controlled by applying a different control value $25A_R$ to each LED $19_R$.

In the illustrated embodiment of FIG. 2, display modulation layer 21B comprises an array of pixels 18. Pixels 18 are controlled to spatially modulate the amount of light transmitted through display modulation layer 21B. In certain embodiments, pixels 18 may comprise LCD pixels. In such embodiments, control values 25B provided to display modulation layer 21B may comprise corresponding LCD pixel drive values. The LCD pixel drive values may be digital or analog drive values.

Each pixel 18 may be sub-divided into a plurality of sub-pixels associated with different colours. For example, pixel 18 may be sub-divided into three red, green and blue (R, G, B) sub-pixels respectively associated with red, green and blue colour filters which are integrated into display modulation layer 21B. According to particular embodiments, the red, green and blue colour filters of display modulation layer 21B are sufficiently "broadband" to allow a sufficient portion of light in the left and right eye spectral bands to pass through the filter, so as to provide sufficient light for the left and right eye images. For example, FIG. 1B shows a curve 15 (represented by a dotted line) plotting intensity as a function of wavelength for the spectral composition of broadband light (e.g. white light having a wide range of wavelengths in the visible light spectrum) which has been passed through red, green and blue colour filters integrated into display modulation layer 21B. Curve 15 is shown superimposed over two complementary sets 11, 13 of red, green and blue spectral bands (similar to those shown in FIG. 1A) which may be used for displaying left and right eye images. As seen in FIG. 1B, the light that is passed through the display modulation layer colour filters comprises broadband spectral components R, G, B. Each of the broadband spectral components R, G, B, respectively, encompasses the spectral components R1, R1; G1, G2 and B1, B2 of the left and right eye spectral bands. As such, the display modulation layer colour filters allow transmission of substantially all of the R, G, B spectral components used to display the left and right eye images.

To view the spectrally separated left and right eye images, the viewer wears a pair of glasses 17 having left and right eye filters $16_L$, $16_R$ (see FIG. 2). Light within the left eye spectral bands passes through left eye filter $16_L$ but is blocked by right eye filter $16_R$. Likewise, light within the right eye spectral bands passes through right eye filter $16_R$ but is blocked by left eye filter $16_L$. Accordingly, the spectrally separated left and right eye images are perceived only by the left and right eyes, respectively.

Controller 22 may implement methods according to embodiments of the invention. Controller 22 may execute a sequence of operations on image data 23. Such sequence of operations may be provided, for example, by software, configurable or hard-wired logic circuits, or a combination thereof. In the illustrated embodiment of FIG. 2, the sequence of operations executed by controller 22 may be provided by software functions 27. Software functions 27 may be stored in a program memory 26, but this is not necessary and software functions 27 may be stored in other suitable memory locations within or accessible to controller 22.

Figure 3:
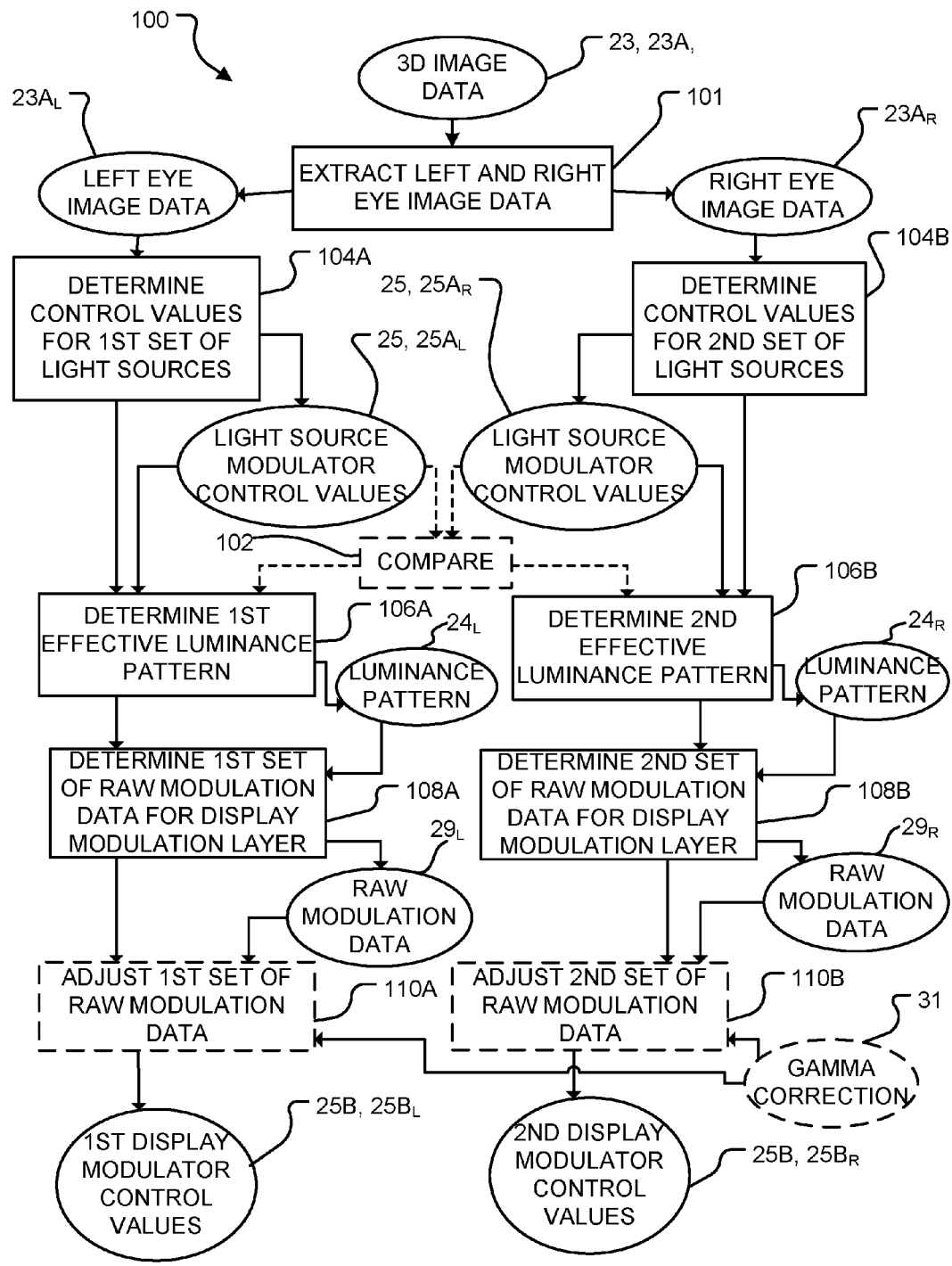
FIG. 3 is a flow chart of a method according to one example embodiment.

FIG. 3 illustrates a method 100 of processing and displaying 3D image data according to one embodiment. Method 100 may be implemented by display system 20 for display on dual modulation display 21 (FIG. 2). Method 100 may be implemented by other suitable image processing hardware and/or software. The illustrated method 100 represents a method for processing and displaying a single frame of 3D image data 23A. Method 100 may be repeated for processing and/or displaying multiple frames of image data 23A.

Method 100 begins by receiving a frame of 3D image data 23A. The frame of image data 23A comprises left eye image data $23A_L$ and right eye image data $23A_R$, which are extracted from image data 23A at block 101. At blocks 104A and 104B, left eye image data $23A_L$ and right eye image data $23A_R$ are used to determine appropriate control values 25A for light source modulation layer 21A (e.g. LED drive values). Based on left eye image data $23A_L$, control values $25A_L$ are determined at block 104A for driving LEDs $19_L$ of light source modulation layer 21A. Based on right eye image data $23A_R$, control values $25A_R$ are determined at block 104B for driving LEDs $19_R$ of light source modulation layer 21A. Suitable techniques may be used to obtain control values $25A_L$, $25A_R$ at blocks 104A and 104B. Such techniques may involve: downsampling of image data, spatially filtering image data, considering the average or weighted average of image data, nearest neighbor interpolation, or the like. Such techniques may be based on factors such as intensity or color of image data 23A. Blocks 104A and 104B may be performed by controller 22 executing instructions according to a function 27A (FIG. 2).

At block 102, control values $25A_L$, $25A_R$ may optionally be compared. The comparison may determine whether a difference between control values $25A_L$, $25A_R$ is above a large threshold value (which may result in artefacts in the image display if control values $25A_L$, $25A_R$ or control values $25B_L$, $25B_R$ are not accordingly adjusted), or whether control values $25A_L$, $25A_R$ are the same or sufficiently close to one another so that the same effective luminance pattern 24 (e.g. one of the effective luminance patterns $24_L$, $24_R$ determined for the left or right eye image data $23A_L$, $23A_R$ at blocks 106A, 106B) may be used for subsequent image processing steps in method 100. Other comparisons of control values $25A_L$, $25A_R$ may be made at block 102.

Method 100 then proceeds to blocks 106A and 106B which involve determining information about the effective luminance patterns $24_L$, $24_R$ of light received at display modulation layer 21B via light source modulation layer 21A. The determination at blocks 106A and 106B may involve light field simulations and may be based at least in part on light source modulation layer control values $25A_L$, $25A_R$ determined at blocks 104A, 104B. By way of non-limiting examples, methods for determining expected luminance received at display modulation layer 21B are described in PCT Publication Nos. WO03/077013, WO2006/010244 and WO2008/092276, which are hereby incorporated herein by reference.

In embodiments where two sets of light sources provide light for the left and right eye images respectively in a time-multiplexed fashion (e.g. such as in the FIG. 2 embodiment), the determination at blocks 106A, 106B may be made on the assumption that at any one time, one-half of the total light sources 19 of light source modulation layer 21A (i.e. either LEDs $19_L$ or $19_R$) may contribute to the effective luminance pattern of light received at display modulation layer 21B. Accordingly, at block 106A an effective luminance pattern $24_L$ is determined which is associated with control values $25A_L$, and at block 106B an effective luminance pattern $24_R$ is determined which is associated with control values $25A_R$. Blocks 106A and 106B may be performed by controller 22 executing instructions according to a function 27B (FIG. 2).

In certain embodiments, an effective luminance pattern may be determined at blocks 106A, 106B for each spectral band (e.g. R1, R2, G1, G2, B1, B2) based on control values 25A. Thus, if the left and right eye spectral bands are not evenly matched (e.g. they do not stimulate the left and right eyes to the same degree), this can be compensated for by considering the effective luminance pattern for each spectral band and adjusting and/or scaling the image data in blocks 108A and 108B (as discussed below).

In dual modulation display systems such as display system 20 (FIG. 2), the light received at display modulation layer 21B is spatially varying due to light source modulation layer 21A. As such, raw modulation data $29_L$, $29_R$ for display modulation layer 21B may be determined at blocks 108A, 108B to accommodate for this spatially varying light pattern. The process at blocks 108A, 108B may involve simulating or modeling the light received at each pixel or group of pixels in display modulation layer 21B (given each of the effective luminance patterns $24_L$, $24_R$ determined at blocks 106A and 106B) and scaling (or otherwise adjusting) left eye image data $23A_L$ or right eye image data $23A_R$ corresponding to each pixel or group of pixels to account for the amount of light expected to be received. Various techniques for determining raw modulation data to accommodate the spatial variation of light introduced by light source modulation layer 21A are described, for example, in PCT Publication Nos. WO03/077013, WO2006/010244 and WO2008/092276. The determination may be performed for each of the left and right eye image data $23A_L$, $23A_R$ resulting in raw modulation data $29_L$ associated with left eye image data $23A_L$ and raw modulation data $29_R$ associated with right eye image data $23A_R$. Blocks 108A, 108B may be performed by controller 22 executing instructions according to a function 27C (FIG. 2).

In some embodiments, raw modulation data $29_L$, $29_R$ determined at blocks 108A, 108B may be adjusted at blocks 110A, 110B to address issues such as non-linearities or other artifacts arising in either or both of light source modulation layer 21A and display modulation layer 21B. For example, raw modulation data $29_L$, $29_R$ may be adjusted to match a gamma correction curve 31 or other specific characteristics of display modulation layer 21B. Blocks 110A, 110B may be performed by controller 22 executing instructions according to a function 27D (FIG. 2).

The result of the process at blocks 110A, 110B (or the process at blocks 108A, 108B, if the process at blocks 110A, 110B is not performed) is a set of display modulator control values 25B which may be used to drive the pixels of display modulation layer 21B over the frame of image data 23A. Control values 25B comprise control values $25B_L$ associated with left eye image data $23A_L$ and control values $25B_R$ associated with right eye image data $23A_R$.

Displaying a frame of image data 23A on display 21 (FIG. 2) may then involve outputting light source modulator control values 25A (including light source modulator control values $25A_L$, $25A_R$) to light source modulation layer 21A and outputting display modulator control values 25B (including display modulator control values $25B_L$, $25B_R$) to display modulation layer 21B. In some embodiments, the driver for light source modulation layer 21B may accept both control values $25B_L$, $25B_R$ and an input for toggling between control values $25B_L$, $25B_R$. Control values $25A_L$, $25A_R$ and $25B_L$, $25B_R$ may be applied sequentially so that the left and right eye images are displayed sequentially on display 21. For example, each of the left and right eye images may be displayed for one-half of a frame period on display 21.

Figure 8:
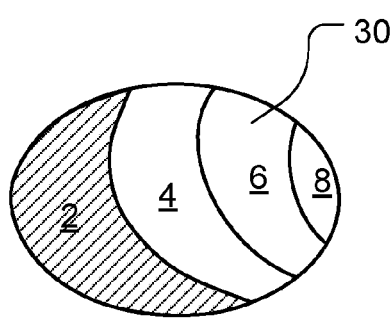
FIG. 8 depicts a frame period divided into intervals within which left and right eye images may be displayed according to a particular embodiment; and, FIG. 9 schematically illustrates a display system that may be used to display 3D images according to another example embodiment.
Figure 8:
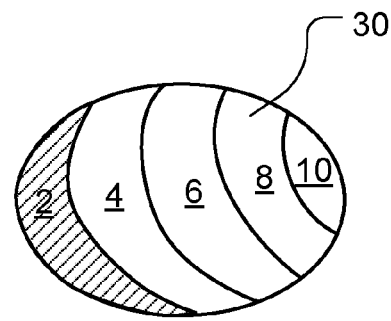
Figure 8:
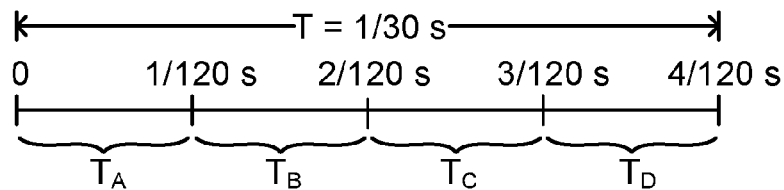

In particular embodiments, to compensate for the effects of latency of image detection by each eye and the manner in which images are interpreted by the brain, the same left and right eye images may be repeatedly displayed within a given frame period in alternation. A repeated presentation of the same left and right eye images results in a clearer interpretation of left and right eye images by the viewer's brain. For example, FIG. 8 shows a frame period T of 1/30th second (i.e. the video frame rate is 30 frames/second). The frame period T is divided into four successive intervals $T_A$, $T_B$, $T_c$ and $T_D$ which are each 1/120th second in duration. The same left eye image may be displayed over intervals $T_A$ and $T_c$ (each 1/120th second in duration, so that the total time that the left eye image is displayed is 1/60th second). The same right eye image may be displayed over intervals $T_B$ and $T_D$ (each 1/120th second in duration, so that the total time the right eye image is displayed is 1/60th second).

The illustrated method 100 involves separate processing associated with each of the left and right eye image data $23A_L$, $23A_R$ (e.g. so as to determine effective luminance patterns $24_L$, $24_R$ and raw modulation data $29_L$, $29_R$, for example). As such, method 100 involves more processing than that required for methods of processing and displaying non-3D (i.e. 2D) image data 23B. To display a sequence of left and right eye images at a rate which is a multiple of the video frame rate (e.g. the video frame rate may be 24 frames/second, 30 frames/second or 48 frames/second, or between 48 frames/second and 60 frames/second, in certain embodiments), implementation of method 100 may require one or more of the following:

fast hardware;

hardware components for processing left and right eye image data $23A_L$, $23A_R$ in parallel; and/or buffering of image data or image processing results (e.g. effective luminance patterns $24_L$, $24_R$ or raw modulation data $29_L$, $29_R$ may be buffered as they are determined).

As described below, methods of processing 3D image data according to other embodiments may reduce the processing time and/or facilitate faster image processing.

For example, to reduce processing, one effective luminance pattern 24 may be determined for an image region and used for processing of both left and right eye image data $23A_L$, $23A_R$ (rather than computing separate luminance patterns $24_L$, $24_R$ as described above for method 100). Such effective luminance pattern 24 may be determined based on the maximum of the light source modulation layer control values $25A_L$, $25A_R$ for that image region. In other embodiments, effective luminance pattern 24 may be determined in some other way (e.g. by averaging the light source modulation layer control values $25A_L$, $25A_R$ for that image region and using the average values to determine the effective luminance pattern). The application of one effective luminance pattern 24 may be suitable for image regions having a low variance in brightness levels, or a variance in brightness levels below a predetermined threshold amount. Such image regions may include, for example, those displaying a surface or background (e.g. sky, water, wall, or the like). Methods of determining whether a single luminance pattern 24 is suitable for image processing in certain image regions are described below with reference to FIGS. 4A, 4B and 5.

Figure 4A:
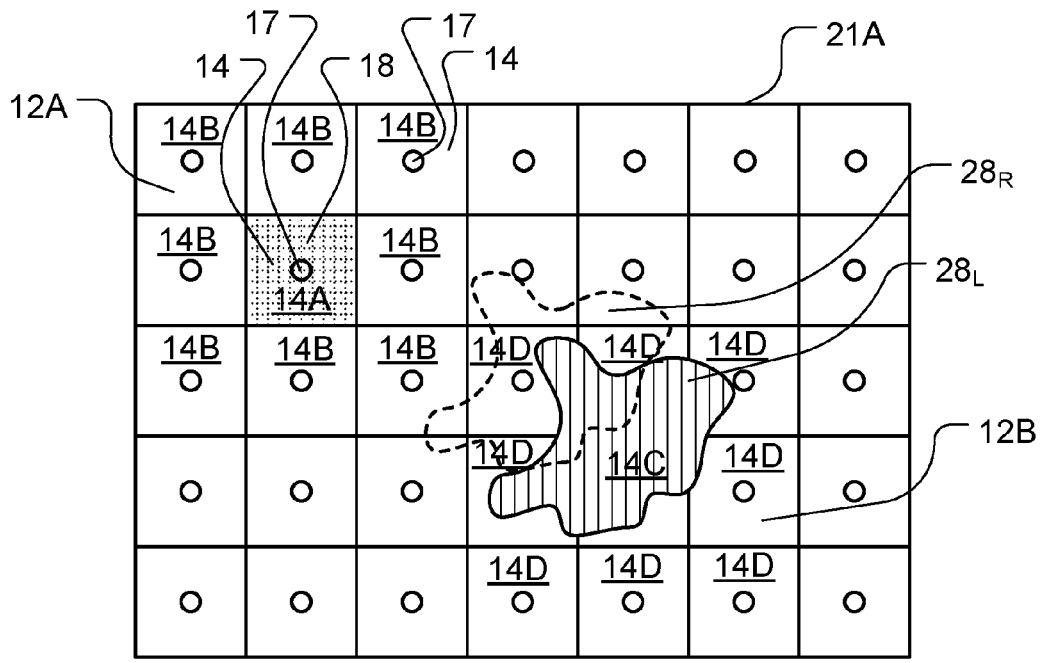
FIGS. 4A and 4B depict left and right eye images of an object, wherein the images are shown superimposed on a portion of a light source modulation layer for displaying the object.
Figure 4B:
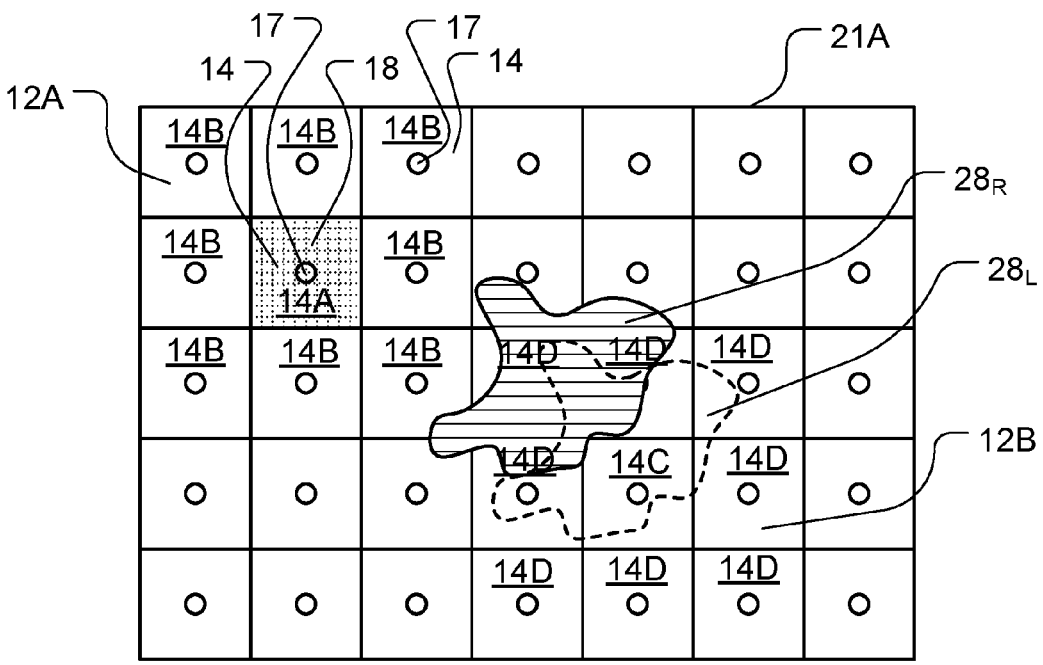

FIGS. 4A and 4B depict left and right eye images $28_L$, $28_R$, respectively, of an object. Images $28_L$, $28_R$ are shown superimposed on a portion of light source modulation layer 21A used to display the depicted object. Left eye image $28_L$ (FIG. 4A) is displayed shifted to the right of right eye image $28_R$ (FIG. 4B). When such images are combined and interpreted by the viewer's brain, the object is perceived to be at some distance in front of the display.

In certain image regions, similar patterns of light contributions from light source modulation layer 21A may be received at display modulation layer 21B for both left and right eye images for a frame of image data. Therefore, for such image regions, it may not be necessary to compute separate effective luminance patterns 24 for each of the left and right eye image data $23A_L$, $23A_R$. For example, FIGS. 4A and 4B show an image divided into image regions 14, including a sample image region 14A of interest for which an effective luminance pattern 24 may be similar for both the left and right eye image data $23A_L$, $23A_R$. For the purposes of assessing whether the effective luminance pattern 24 is similar for both the left and right eye image data $23A_L$, $23A_R$ in image region 14A of interest, an area 12A including image region 14A of interest may be defined. In the illustrated embodiment, area 12A includes image region 14A and its nine neighbouring image regions 14B.

In the illustrated embodiment, each image region 14 is associated with a pair 17 of light sources on light source modulation layer 21A. Each light source pair 17 may include a light source $19_L$ for displaying the left eye image and a light source $19_R$ for displaying the right eye image (see FIG. 2). Control values 25A for the light sources 19 of each light source pair 17 in area 12A may be compared and used to determine whether an effective luminance pattern 24 for image region 14A of interest is similar for left and right eye image data $23A_L$, $23A_R$. For example, the effective luminance pattern 24 for image region 14A may be determined to be similar for left and right eye image data $23A_L$, $23A_R$ if one or more of the following conditions ("similar effective luminance pattern conditions") is met:

all of, or at least a certain number of, control values $25A_L$ associated with left eye image data $23A_L$ for area 12A (FIG. 4A) are identical to (or do not deviate by more than a certain amount from) the corresponding control values $25A_R$ associated with right eye image data $23A_R$ for area 12A (FIG. 4B);

the sum of any differences between control values $25A_L$ associated with left eye image data $23A_L$ for area 12A (FIG. 4A) and the corresponding control values $25A_R$ associated with right eye image data $23A_R$ for area 12A (FIG. 4B) is below a threshold value;

the maximum difference between control values $25A_L$ associated with left eye image data $23A_L$ for area 12A (FIG. 4A) and the corresponding control values $25A_R$ associated with right eye image data $23A_R$ for area 12A (FIG. 4B), is below a threshold value;

the difference between an average of control values $25A_L$ associated with left eye image data $23A_L$ for area 12A (FIG. 4A) and an average of control values $25A_R$ associated with right eye image data $23A_R$ for area 12A (FIG. 4B), is below a threshold value; and/or the like.

In other embodiments, left and right eye image data $23A_L$, $23A_R$ (instead of control values $25A_L$, $25A_R$) are compared to assess the similarity in effective luminance patterns. Accordingly, any of the above comparisons may be made by using left and right eye image data $23A_L$, $23A_R$ in place of control values $25A_L$, $25A_R$.

If the effective luminance pattern 24 for image region 14A is determined to be similar for left and right eye image data $23A_L$, $23A_R$ (e.g. by meeting one or more of the above similar effective luminance pattern conditions), the effective luminance pattern 24 may be computed for image region 14A. This may involve establishing light source modulation layer control values 25A for each image region 14 in area 12A and using such control values 25A to determine effective luminance contributions to image region 14A. Control values 25A may be established, for example, by: selecting the maximum of control values $25A_L$, $25A_R$ for each image region 14 (or light source) in area 12A; selecting one of control values $25A_L$, $25A_R$ for each image region 14 (or light source) in area 12A; or averaging control values $25A_L$, $25A_R$ for each image region 14 (or light source) in area 12A, and in some embodiments, scaling the averaged values.

If the effective luminance pattern 24 for an image region is not determined to be similar for left and right eye image data $23A_L$, $23A_R$, effective luminance patterns 24 may be computed separately for each of left and right eye image data $23A_L$, $23A_R$ for such image region (similarly to the determinations at blocks 106A and 106B of method 100 shown in FIG. 3). For example, FIGS. 4A and 4B show an image region 14C of interest for which an effective luminance pattern 24 may not be similar for both the left and right eye image data $23A_L$, $23A_R$. For the purposes of assessing whether the effective luminance pattern 24 is similar for both the left and right eye image data $23A_L$, $23A_R$ in image region 14C of interest, an area 12B including image region 14C of interest may be defined. In the illustrated embodiment, area 12B includes image region 14C and its nine neighbouring image regions 14D. The depicted object is displayed at image region 14C and some of neighbouring image regions 14D. In left eye image $28_L$ (FIG. 4A), the object is displayed at four image regions 14D and at image region 14C. In right eye image $28_R$ (FIG. 4B), the object is displayed at three image regions 14D and at image region 14C. The depicted object has a different brightness level than its surroundings (e.g. such as in the case of a bright object against a dark background or a dark object against a bright background). Because of the differences in the location of the object in left and right eye images $28_L$, $28_R$, the effective luminance patterns for image region 14C may vary significantly between the left and right eye image data $23A_L$, $23A_R$. As such, effective luminance patterns $24_L$, $24_R$ for image region 14C may be determined separately for each of the left and right eye image data $23A_L$, $23A_R$, respectively.

Figure 5:
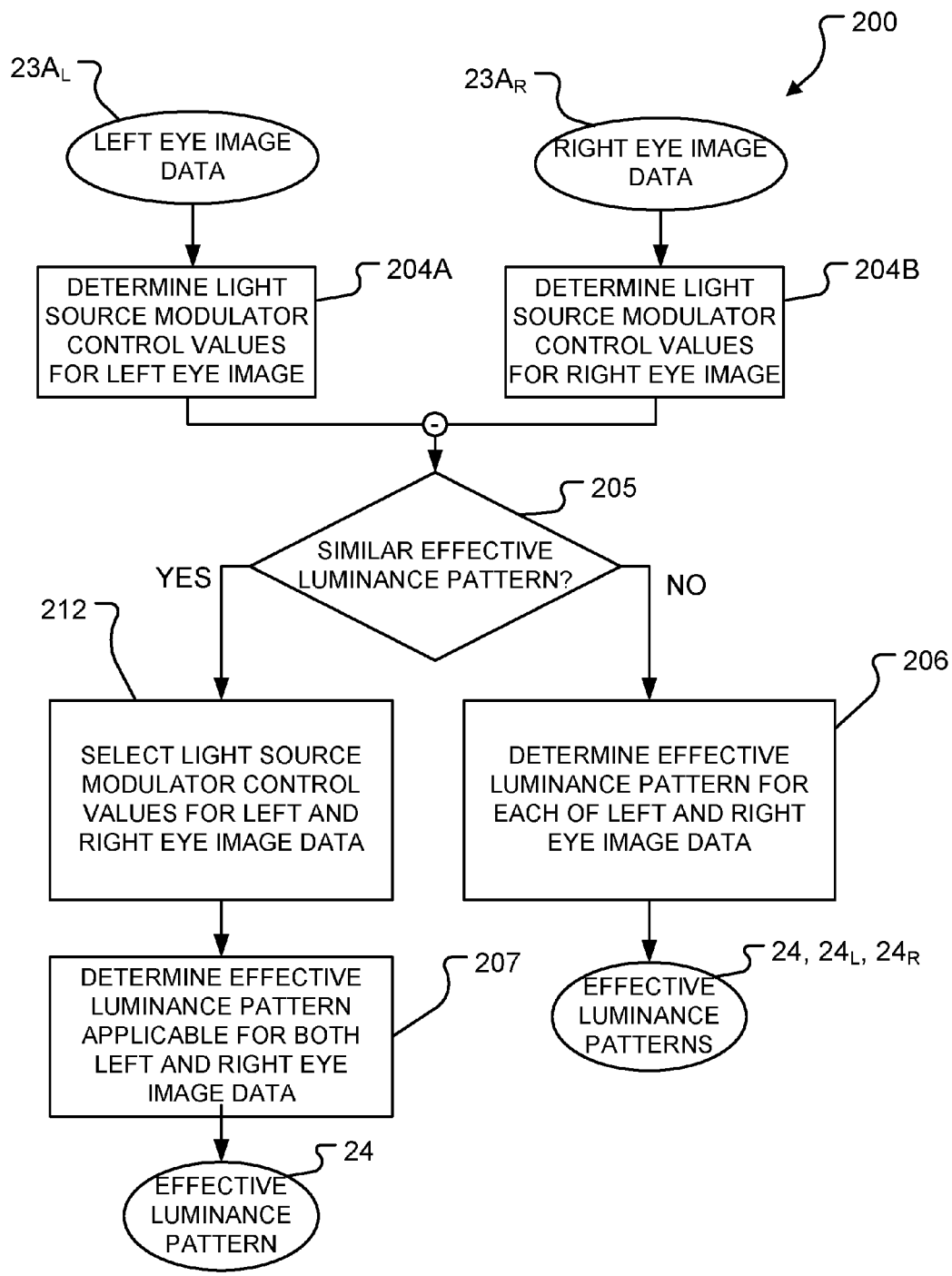
FIG. 5 is a flow chart of a method according to another example embodiment.

FIG. 5 illustrates a method 200 of determining an effective luminance pattern for an image region based on 3D image data. Method 200 incorporates some of the steps described above with reference to FIGS. 4A and 4B. Method 200 may be implemented by display system 20 for display on dual modulation display 21 (FIG. 2). Method 200 may be implemented by other suitable image processing hardware and/or software. The illustrated method 200 may be used in place of the determinations at blocks 104A, 104B and 106A, 106B of FIG. 3 to determine effective luminance patterns for image data 23A. Method 200 may be repeated for determining effective luminance patterns for multiple frames of image data 23A.

Method 200 begins by receiving left eye image data $23A_L$ and right eye image data $23A_R$ for a frame of image data, and determining, at blocks 204A and 204B, light source modulator control values $25A_L$, $25A_R$ associated with left and right eye image data $23A_L$, $23A_R$, respectively. The image may be divided into image regions, each region corresponding to one or more light sources on light source modulation layer 21A (see FIGS. 4A, 4B). An image area comprising a cluster of image regions, including an image region of interest, may also be defined. Within each defined area, corresponding control values $25A_L$, $25A_R$ associated with each light source may be compared. An assessment of whether an effective luminance pattern 24 for an image region of interest is similar for left and right eye image data $23A_L$, $23A_R$ may be carried out at block 205 based on a comparison of corresponding control values $25A_L$, $25A_R$. Such assessment may involve one or more of the above-noted similar effective luminance pattern conditions described above with reference to FIGS. 4A and 4B.

If a similar effective luminance pattern for left and right eye image data $23A_L$, $23A_R$ in the image region of interest is determined at block 205, method 200 proceeds to block 212. At block 212, control values 25A for light sources within the defined area are established (e.g. by selecting the maximum of control values $25A_L$, $25A_R$ for each light source, selecting one of control values $25A_L$, $25A_R$ for each light source; or averaging control values $25A_L$, $25A_R$ for each light source, and in some embodiments, scaling the averaged values). Control values 25A established at block 212 may then be applied at block 207 to determine an effective luminance pattern 24 applicable for both left and right eye image data $23A_L$, $23A_R$ for the image region of interest (e.g. as described above with reference to image region 14A of FIGS. 4A, 4B).

If no similar effective luminance pattern is determined at block 205, method 200 proceeds to block 206. At block 206, effective luminance patterns $24_L$, $24_R$ are determined for each of the left and right eye image data $23A_L$, $23A_R$ within the image region of interest (e.g. as described for image region 14C of FIGS. 4A, 4B).

In some embodiments, display system 20 may operate in either a 3D display mode or a non-3D (i.e. 2D) display mode according to the image data received and/or viewer preferences. When operating in the 3D display mode, display system 20 may implement one of the methods described herein to display a 3D image from 3D image data 23A. When operating in the 2D display mode, display system 20 may implement another method (e.g. as described below) to display a 2D image from 2D image data 23B. For particular embodiments, methods of displaying a 2D image may account for the number of light sources being twice that which is available for display of a left or right eye image in 3D display mode—i.e. because 2D image display does not require spectrally separating light by time multiplexing light from LEDs $19_L$ and $19_R$ according to the different left and right eye images, all of LEDS $19_L$ and $19_R$ are potentially available to provide light for the image when display system 20 is operating in 2D display mode.

Figure 6:
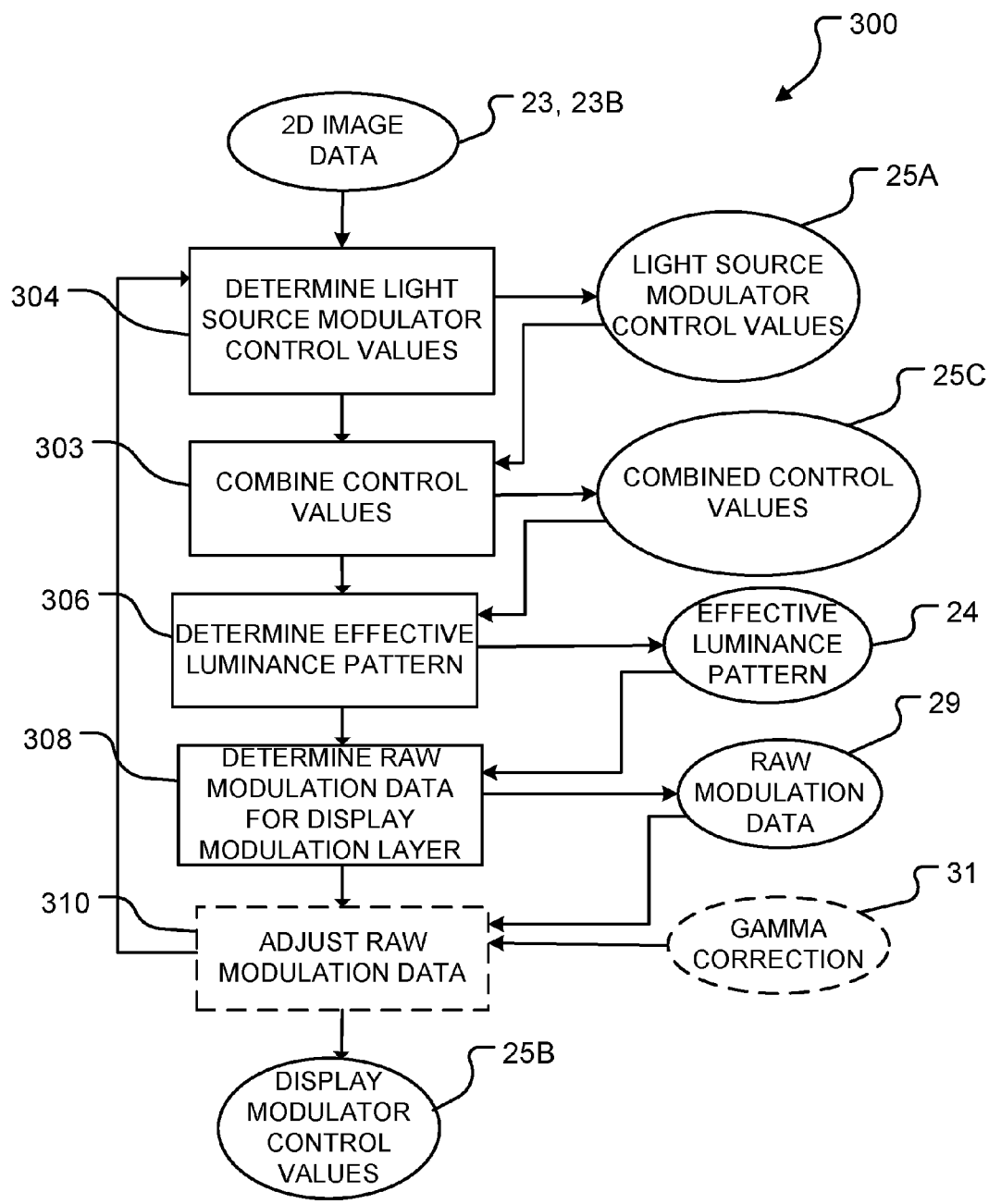
FIG. 6 is a flow chart of a method according to yet another example embodiment.

FIG. 6 illustrates a method 300 of processing 2D image data according to one embodiment. Method 300 is similar in some respects to method 100. Aspects of method 300 that are the same or similar to aspects of method 100 are ascribed similar reference numerals, except that in method 300, the reference numerals are prefixed with a "3" instead of a "1". Method 300 may be implemented by display system 20 for display on dual modulation display 21 (FIG. 2). Method 300 may be implemented by other suitable image processing hardware and/or software. The illustrated method 300 represents a method for processing and displaying a single frame of 2D image data 23B. Method 300 may be repeated for processing and/or displaying multiple frames of image data 23B.

Method 300 begins by receiving a frame of 2D image data 23B, and determining, at block 304, light source modulator control values 25A for driving the light sources of light source modulation layer 21A (FIG. 2). In embodiments where light source modulation layer 21A comprises light sources 19 arranged in pairs 17 (e.g. pairs 17 of LEDs $19_L$, $19_R$ as seen in the FIG. 2 embodiment), each pair of light sources may be treated as a single light source for the purposes of determining an effective luminance pattern. As such, at block 303, light source modulator control values 25A for each pair of light sources may be added and/or scaled to provide combined control values 25C for light source modulation layer 21A. Based on these control values 25C, an effective luminance pattern 24 may be determined at block 306. Method 300 proceeds to block 308 where raw modulation data 29 for display modulation layer 21B is determined, based at least in part on the effective luminance pattern 24 determined at block 306 and image data 23B. At block 310, the raw modulation data 29 may be adjusted in view of non-linearities or other artifacts arising in either or both of light source modulation layer 21A and display modulation layer 21B (e.g. by matching a gamma correction curve 31 of the display modulation layer 21B). The result of the block 310 process (or block 308 process, if the block 310 process is not performed) is a set of display modulator control values 25B which may be used to drive the pixels of display modulation layer 21B over the frame of image data 23B.

In particular embodiments, operation in 2D mode may be used to increase the brightness of the display or areas of the display, as compared with operating in 3D mode. For example, display system 20 may be selectively operated in 2D or 3D mode on a frame by frame basis. Display system 20 may be operated to selectively display specific image areas for a particular frame or frames in 2D or 3D mode.

Figure 7A:
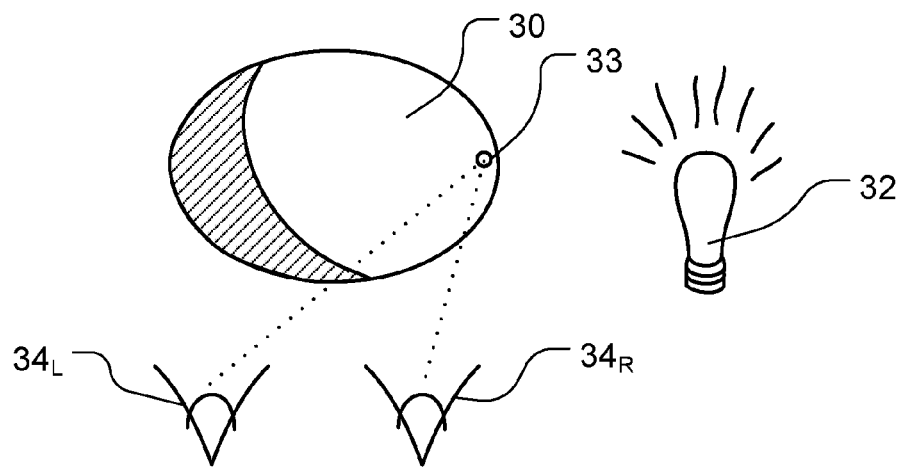
FIG. 7A depicts an illuminated object to be displayed in 3D.

According to some embodiments, the brightness of an object displayed in 3D may vary according to the object's depth and the object's distance from an illumination source for the image. For example, FIG. 7A shows an image of an object 30 illuminated by an illumination source 32 positioned close to the viewer and to one side of object 30. The viewer's left eye $34_L$ sees a different image of object 30 than does the viewer's right eye $34_R$. As seen in FIG. 7A, the brightest point 33 of object 30 appears at the side of object 30 which is closest to illumination source 32, and is located closer to the right eye $34_R$ than to the left eye $34_L$. From left eye $34_L$'s point of view, relatively more surface area of object 30 appears to be in shadow (see FIG. 7B). From right eye $34_R$'s point of view, relatively more surface area of object 30 appears to be brightly lit (see FIG. 7C). Between the darkest and brightest parts of object 30, the object is displayed with increasing levels or bands of brightness, as shown by bands 2, 4, 6 and 8 in FIG. 7B and by bands 2, 4, 6, 8 and 10 in FIG. 7C, with the higher band numbers indicating relatively brighter parts of the object.

According to particular embodiments, light sources $19_L$ of light source modulation layer 21A may be driven to provide spatially modulated light for displaying a left eye image to left eye $34_L$. Light sources $19_R$ of light source modulation layer 21A may be driven to provide spatially modulated light for displaying a right eye image to right eye $34_R$. The spatial modulation of light sources $19_L$ and $19_R$ may be employed to display left and right eye images with areas having different brightness levels, such as those images illustrated in FIGS. 7B and 7C. This provides for a more realistic stereoscopic effect.

Figure 9:
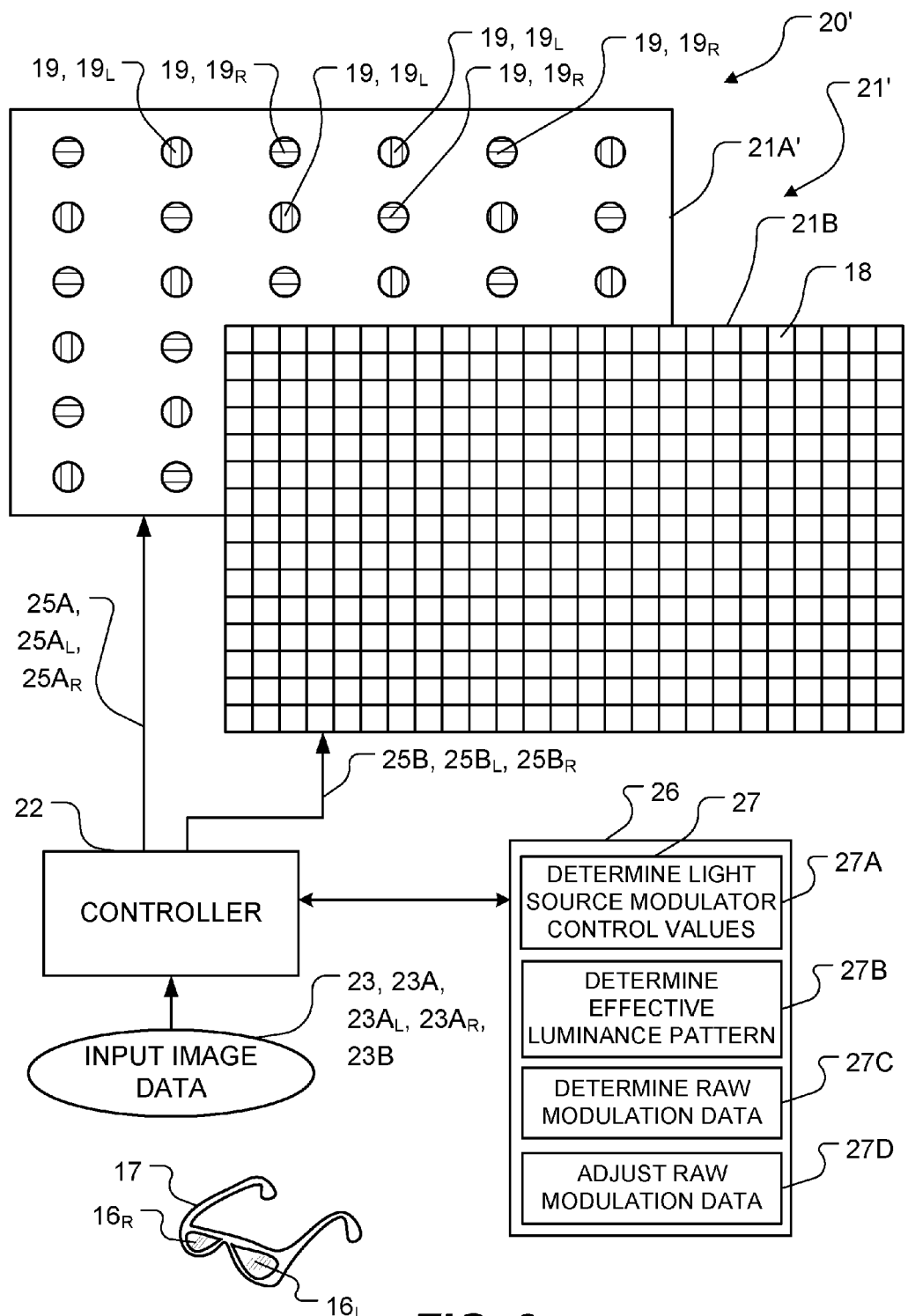

According to some embodiments, spectrally separated light for displaying right and left eye images may be provided by light sources which are configured or arranged in a different manner than that shown in FIG. 2. For example, FIG. 9 shows a dual modulation display system 20' according to another particular example embodiment. Display system 20' may be configured to perform methods of the invention. Display system 20' may operate in a 3D display mode for displaying a 3D image from 3D image data 23A. Display system 20' may also operate in a 2D display mode for displaying a non-3D image from 2D image data 23B. Display system 20' is similar in some respects to the FIG. 2 display system 20. Aspects of display system 20' that are the same or similar to aspects of the FIG. 2 display system 20 are ascribed similar reference numerals.

In the illustrated embodiment of FIG. 9, display system 20' comprises a display 21' having a light source modulation layer 21A' and display modulation layer 21B. Light source modulation layer 21A' comprises a matrix of spaced apart light sources 19 (including light sources $19_L$, $19_R$). In each row or column of light sources 19, designated "left eye" light sources $19_L$ for providing light for left eye images alternate with designated "right eye" light sources $19_R$ for providing light for right eye images. Light sources 19 may comprise solid state illumination devices, such as LEDs.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A display system for displaying three-dimensional image data comprising first-eye image data and second-eye image data, said display system comprising:
    a light source modulation layer comprising a first plurality of light sources and a second plurality of light sources, said first plurality of light sources and said second plurality of light sources being operable to provide spatially-modulated light for display of said first-eye image data and said second-eye image data, respectively;
    a display modulation layer comprising a plurality of pixels operable to spatially modulate light received from said light source modulation layer; and
    a controller operative to
        determine a set of first-eye light source modulator control values based at least in part on a set of first-eye image data, said set of first-eye light source modulator control values being configured to produce a first-eye luminance pattern expected to be received on said display modulation layer,
        determine a set of second-eye light source modulator control values based at least in part on a set of second-eye image data, said set of second-eye light source modulator control values being configured to produce a second-eye luminance pattern expected to be received on said display modulation layer,
        make a comparison of at least some of said set of first-eye light source modulator control values and at least some of said set of second-eye light source modulator control values, and
        depending on said comparison, adjust a set of first-eye display modulation layer control values based on said second-eye luminance pattern; and
    wherein said controller is configured to cause pixels associated with said set of first-eye image data to be illuminated by said second-eye illumination pattern when said comparison indicates a non-zero low variance in brightness between at least some of said set of first-eye light source modulator control values and said set of second-eye light source modulator control values.

2. The display system of claim 1, wherein said controller is further operative to adjust a set of second-eye display modulation layer control values based on said second-eye luminance pattern.

3. The display system of claim 2, wherein said controller is further operative to:
    determine a second set of first-eye light source modulator control values based at least in part on a second set of first-eye image data, said second set of first-eye light source modulator control values being configured to produce a second first-eye luminance pattern expected to be received on said display modulation layer;
    determine a second set of second-eye light source modulator control values based at least in part on a second set of second-eye image data, said second set of second-eye light source modulator control values being configured to produce a second second-eye luminance pattern expected to be received on said display modulation layer;
    make a second comparison of at least some of said second set of first-eye light source modulator control values and at least some of said second set of second-eye light source modulator control values; and depending on said second comparison, adjust a second set of second-eye display modulation layer control values based on said second first-eye luminance pattern.

4. The display system of claim 1, wherein:
said set of first-eye image data is associated with a region of interest within a frame of first-eye image data; and
said set of second-eye image data is associated with a corresponding region of interest within a same frame of second-eye image data.

5. The display system of claim 1, wherein said set of first-eye display modulation layer control values comprises at least some of said set of first-eye image data.

6. The display system of claim 1, wherein:
said first plurality of light sources is configured to provide light having a first spectral composition; and
said second plurality of light sources is configured to provide light having a second spectral composition which is complementary to said first spectral composition.

7. The display system of claim 6, wherein said first and said second pluralities of light sources are operable to sequentially provide, in a time-multiplexed manner, spatially-modulated light for display of said set of first-eye image data and spatially modulated light for display of said set of second-eye image data.

8. The display system of claim 1, wherein said first and said second pluralities of light sources are arranged on said light source modulation layer as an array of light source pairs, each light source pair comprising one of said first plurality of light sources and one of said second plurality of light sources.

9. The display system of claim 8, wherein said first and second pluralities of light sources comprise light emitting diodes (LEDs).

10. The display system of claim 9, wherein said LEDs comprise tri-color LEDs.

11. The display system of claim 1, wherein said controller is further configured to cause first-eye and second-eye images within a given frame to be repeated in alternation.

12. A method of displaying three-dimensional image data on a display system having a light source modulation layer and a display modulation layer, said method comprising:
receiving a set of first-eye image data and a set of second-eye image data;
determining a set of first-eye light source modulator control values based at least in part on said set of first-eye image data, said set of first-eye light source modulator control values for driving a first plurality of light sources of said light source modulation layer;
determining a set of second-eye light source modulator control values based at least in part on said set of second-eye image data, said set of second-eye light source modulator control values for driving a second plurality of light sources of said light source modulation layer;
determining a first-eye luminance pattern expected to be received on said display modulation layer from said first plurality of light sources based at least in part on said set of first-eye light source modulator control values;
determining a second-eye luminance pattern expected to be received on said display modulation layer from said second plurality of light sources based at least in part on said set of second-eye light source modulator control values;

making a comparison of at least a portion of said set of first-eye light source modulator control values and at least a portion of said set of second-eye light source modulator control values;
depending on said comparison, adjusting a set of first-eye display modulation layer control values based on said second-eye luminance pattern; and
causing pixels of said display modulation layer that are associated with said set of first-eye image data to be illuminated by said second-eye illumination pattern when said comparison indicates a non-zero low variance in brightness between at least some of said set of first-eye light source modulator control values and said set of second-eye light source modulator control values.

13. The method of claim 12, further comprising adjusting a set of second-eye display modulation layer control values based on said second-eye luminance pattern.

14. The method of claim 13, further comprising:
applying said set of second-eye light source modulator control values to said light source modulation layer and said set of first-eye display modulation layer control values to said display modulation layer; and
applying said set of second-eye light source modulator control values to said light source modulation layer and said set of second-eye display modulation layer control values to said display modulation layer.

15. The method of claim 13, further comprising:
receiving a second set of first-eye image data and a second set of second-eye image data;
determining a second set of first-eye light source modulator control values based at least in part on said second set of first-eye image data;
determining a second set of second-eye light source modulator control values based at least in part on said second set of second-eye image data;
determining a second first-eye luminance pattern expected to be received on said display modulation layer based at least in part on said second set of first-eye light source modulator control values;
determining a second second-eye luminance pattern expected to be received on said display modulation layer based at least in part on said second set of second-eye light source modulator control values;
making a second comparison of at least some of said second set of first-eye light source modulator control values and at least some of said second set of second-eye light source modulator control values; and
depending on said second comparison, adjusting a second set of second-eye display modulation layer control values based on said second first-eye luminance pattern.

16. The method of claim 12, wherein:
said set of first-eye image data is associated with a region of interest within a frame of first-eye image data; and
said set of second-eye image data is associated with a corresponding region of interest within a same frame of second-eye image data.

17. The method of claim 12, wherein said set of first-eye display modulation layer control values comprises at least some of said set of first-eye image data.

18. The method of claim 12, wherein:
said first plurality of light sources is configured to provide light having a first spectral composition; and said second plurality of light sources is configured to provide light having a second spectral composition which is complementary to said first spectral composition.

19. The method of claim 18, wherein said first and said second pluralities of light sources sequentially provide, in a time-multiplexed manner, spatially-modulated light for display of said set of first-eye image data and said set of second-eye image data.

20. The method of claim 12, wherein said first and said second pluralities of light sources are arranged on said light source modulation layer as an array of light source pairs, each light source pair comprising one of said first plurality of light sources and one of said second plurality of light sources.

21. The method of claim 12, wherein said first and said second pluralities of light sources comprise light emitting diodes (LEDs).

22. The method of claim 21, wherein said LEDs comprise tri-color LEDs.

23. The method of claim 12, further comprising repeatedly displaying first-eye and second-eye images within a given frame in alternation.

24. The method of claim 12, wherein:
said set of first-eye light source modulator control values is associated with one of a left-eye view and a right-eye view of a single frame of 3-D image data; and
said set of second-eye light source modulator control values is associated with the other of said left-eye view and said right-eye view of said single frame of 3-D image data.

25. The method of claim 12, wherein said step of making said comparison includes determining similarity between at least some of said set of first-eye light source modulator control values and at least some of said set of second-eye light source modulator control values.

* * * * *